Patented June 20, 1950

2,512,435

UNITED STATES PATENT OFFICE 2,512,435

EMULSIONS

Reginald Gordon Mitchell, Harold Cecil Tait, Cedric Lansdale Gilbert, and Werner David, London, England, assignors to Shell Development Company, San Francisco, Calif., a corporation of Delaware No Drawing. Application January 3, 1948, Serial No. 472. In Great Britain April 11, 1947

9 Claims. (Cl. 106—312)

This invention relates to a method of making stable emulsions, and to the compositions produced thereby. More particularly, this invention pertains to the production of emulsions containing, as an essential ingredient, one or more water-soluble organic sulfonates and/or sulfates of the group consisting of alkyl, aryl, alkylaryl, arylalkyl, and cycloalkyl organic sulfonates and sulfates having at least seven carbon atoms, and preferably between about 10 and about 18, or even as high as 30 carbon atoms, said sulfonates and/or sulfates having, if desired, one or more polar groups attached to a carbon atom of an organic radical, such as carboxyl, hydroxyl, oxo, alkoxy, mercapto, cyano, sulfonyl, thiocyano, nitro and the like. Emulsions containing these ingredients have the property of being capable of forming unusually stable oil-in-water emulsions when in the presence of novel dispersing or solubilizing agents of this invention. This dispersing or solubilizing agent is an oil-soluble petroleum sulfonate which has been subjected to a specific treatment as will be hereinafter fully described.

It is well known in the art that oil-soluble petroleum sulfonates produced in the refining of certain petroleum hydrocarbon fractions possess to a certain degree the property of dispersing or solubilizing oil emulsions in aqueous mediums. Although some oil-soluble petroleum sulfonates derived from different petroleum hydrocarbon fractions exhibit little if any capacity for dispersion in aqueous mediums, those which do possess this solubilizing property exhibit it in a rather erratic manner. Thus, it is not uncommon to find two oil-soluble petroleum sulfonates, produced from the same petroleum hydrocarbon fractions, one of which might exhibit good dispersing properties in aqueous mediums while the other will exhibit little if any capacity for dispersion in aqueous mediums.

Oil-soluble petroleum sulfonic acids are generally prepared by acid treating a petroleum hydrocarbon fraction with sulfuric acid, oleum, sulfonyl chloride, and the like. The sulfonic acids can be recovered by removing the sludge, and the oil-soluble sulfonic acids which remain substantially in the resultant oil layer can be neutralized to form the sulfonates. Any oil soluble sulfonates remaining in the sludge can be separated from the sludge layer which contains water-soluble sulfonic acids, commonly known as green acids and added to the acid treated oil prior to neutralization. The oil layer containing the oil-soluble sulfonic acids, known as mahogany acids, can be washed with an aqueous alcoholic solution, so as to recover the mahogany acid and then neutralized with an alkali or ammonium; or the oil-soluble sulfonic acids can be first neutralized and the oil-soluble sulfonates recovered from the alcoholic solution as the salts. The crude oil-soluble sulfonates can be purified by washing so as to remove entrained inorganic salts and other impurities.

The chief drawback of these oil-soluble sulfonates is their erratic tendency to disperse emulsifiable compositions in aqueous mediums. Thus, even when preparing oil-soluble petroleum sulfonates having some ability of aiding in forming stable emulsions, great care has to be taken in selecting the proper petroleum hydrocarbon fraction and the acid used therewith, as well as the particular neutralization and recovery treatments to which the acid treated fraction is subjected. Even when these precautionary measures are taken, it is not infrequent that such sulfonates exhibit for some unknown reason little if any capacity to disperse in aqueous mediums or to form stable emulsions.

Since this type of acid treatment is not confined to any particular petroleum fraction but to a crude oil in general and different fractions thereof, the problem of obtaining an oil-soluble sulfonate having uniform properties especially as to dispersibility in aqueous mediums becomes exceedingly complex. This is particularly true since it is desirable to obtain a uniform oil-soluble sulfonate product having good dispersible properties regardless of the fact that originally it might have been obtained as a by-product in the refinement of turbine oils, transformer oils, lubricating oils, white oils, light fraction boiling below the lubricating oil range, and the like.

It is an object of this invention to prepare an oil-emulsion having a special ingredient and being capable of being uniformly dispersed in an aqueous medium with the aid of a specially treated oil-soluble petroleum sulfonate. Still another object is to prepare stable aqueous emulsions having various industrial applications, said emulsions being readily dispersible in aqueous medium with a specially treated sulfonate product obtained as a by-product in the acid treatment of petroleum. Still another object of this invention is to produce a stable emulsion of oil-in-water, the stability of which is not effected by time or use. Other objects of this invention will become apparent from reading of the description of the invention as given hereinbelow.

It has now been discovered that emulsions containing as an active ingredient and/or ingredients water-soluble organic sulfonates and/or sulfates of the group consisting of alkyl, aryl, alkylaryl, arylalkyl, cycloalkyl organic sulfonates and sulfates, having at least seven carbon atoms, and preferably between about 10 and about 18, or even 30 carbon atoms, (said sulfonates and/or sulfates, if desired, containing a polar group or groups attached to a carbon atom of the class consisting of carboxyl, hydroxyl, oxo, alkoxy, mercapto, cyano, thiocyano, sulfonyl, nitro, and the like), can be stably dispersed in any aqueous medium with the aid of a portion of an oil-soluble petroleum sulfonate fraction which portion is the part of the oil-soluble petroleum sulfonate which is extracted by a light hydrocarbon e. g., petroleum ether when the oil-soluble petroleum sulfonate is dissolved in aqueous alcoholic alkali, and this solution is extracted with said light hydrocarbon. The light hydrocarbon is a hydrophobic hydrocarbon solvent boiling below about 100° C., said hydrocarbon preferably having a boiling point range between about 60° C. and about 95° C. are: isopentane, normal pentane, 2,2 dimethylbutane, 2,3 dimethylbutane, 2-methylpentane, 3-methylpentane, normal hexane, 2,2 dimethylpentane, 2,4 dimethylpentane, 2,2,3 trimethylbutane, 3,3-dimethylpentane, 2-methylhexane, 3-methylhexane, 3-ethylpentane, normal hexane, isooctane, cyclopentane, methylcyclopentane, cyclohexane, methylcyclohexane, ethylcyclohexane, isoprene, pentadiene, methylbutadiene, benzene, and mixtures of said hydrocarbons.

The sulfonate fractions which when combined with emulsions of this invention impart to the emulsion uniform dispersibility in an aqueous medium can be obtained by treating a crude sulfonate dissolved in a hot aqueous alcoholic solution, and solvent treating it with a low boiling hydrocarbon such as petroleum ether. The solvent soluble fraction of the sulfonate is recovered and may be subjected to a number of such treatments and the solvent soluble fractions bulked, washed, filtered and the solvent removed by distillation or any other suitable means. The residue which consists of sulfonates soluble in this hydrocarbon solvent may be purified by an acetone treatment or any other suitable material capable of removing moisture and other contaminants. The hydrocarbon soluble sulfonate fraction of this invention when combined with emulsions as herein described can be dispersed in any aqueous medium and form stable compositions for long periods of time.

Before proceeding with a description of emulsion compositions of this invention an illustrative method of preparing a specific dispersing agent of this invention will be described.

An oil-soluble ammonium or alkali metal salt of naphtha sulfonic acid is dissolved in hot aqueous ethanol containing about 50% by volume of ethanol neutralized with dilute acid if necessary and extracted several times with portions of petroleum ether. To approximately 100 parts of the resulting aqueous ethanol solution of the soap, about 50 parts of water and about 50 parts of about 0.427 N alcohol potash are added to yield an aqueous solution which contains 0.6 gram potash per 100 cc. of 50 percent aqueous ethanol. This solution is then extracted with 50 parts of petroleum ether at about 40° to 60° C. and the two phases thus formed separated. The aqueous alcoholic solution is again extracted with 50 parts of petroleum ether and the two phases again separated. The petroleum ether layers are then bulked and washed a number of times with aqueous alcoholic potash of the same concentration as above, filtered and the petroleum ether removed by distillation. The residue which consists of the petroleum ether soluble constituents may be further treated with acetone to remove last traces of water on subsequent evaporation.

Base emulsifying compositions which can be dispersed in any aqueous medium with the aid of oil-soluble petroleum sulfonates of this invention must also contain at least one or more water-soluble sulfonates and/or sulfates as referred to above. The water-soluble sulfonates and/or sulfates which can be employed in compositions of this invention include, for example, salts of the sulfonated and sulfated aliphatic alcohols containing at least seven carbon atoms. A preferred class of salts of the secondary alkyl sulfuric acids are those obtained from olefines derived from cracked paraffin wax by the processes described and covered in the U. S. Patents 2,139,393 and 2,172,228. Also, salts of the primary alkyl sulfuric acids prepared for example from alcohols obtained by reduction from naturally occurring or synthetic fatty acid derivatives are suitable. In addition water-soluble salts of alkylaryl sulfonic acids such as the dodecyl cumene sulfonic acid, dodecyl benzene sulfonic acid, keryl benzene sulfonic acid, octyl benzene sulfonic acid, nonyl benzene sulfonic acid, decyl benzene sulfonic acid, undecyl benzene sulfonic acid, dodecyl benzene sulfonic acid, tridecyl benzene sulfonic acid, tetradecyl benzene sulfonic acid, pentadecyl benzene sulfonic acid, hexadecyl benzene sulfonic acid, tricosyl benzene sulfonic acid and their mixtures. Other sulfonates which can be used are: diamyl ester of sodium sulfosuccinic acid, dihexyl ester of sodium sulfosuccinic acid, alkyl naphthalene sodium sulfonate, octyl phenyl phenol sodium monosulfate, octyl diphenyl sodium mono sulfonate, dibutyl phenyl phenol sodium disulfonate, mono octyl phenyl phenol potassium mono sulfonate, alkyl phenyl phenol amino monosulfonate, salts of sulfonated higher fatty amides, polymerized sodium salts of alkyl naphthalene sulfonic acids, sodium salt of oleyl sulfate, sodium salt of lauryl sulfate, sodium sulfonate of oleic acid ester, salts of sulfonated higher alcohols, e. g. sodium salts of lauryl and oleyl sulfates, di-n-hexyl ester of sodium 4-sulfo-phthalic acid, di-n-hexyl ester of potassium 4-sulfo-phthalic acid and the like can be used. The sulfo carboxylic acid ester in the form of their Na, K, Li or ammonium or amine salts and specifically exemplified by dioctyl sodium sulfo succinate, dicapryl sodium sulfosuccinate, difurfyl sodium sulfosuccinate, dioctyl sodium sulfoadipate, dioctyl sodium sulfomalonate can be used as well as ammonium lauryl sulfate, ammonium hexyl sulfate, ammonium ricinoleo sulfate, the sodium salts of higher secondary alkyl sulfates having $C_{10}$ to $C_{18}$ carbon in the alkyl chain, sodium cetyl sulfate, and the like and mixtures of said sulfonates and/or sulfate compounds can be used.

The emulsifying compositions of this invention may contain, in addition to the ingredients described above, other ingredients known to be useful in emulsifying compositions and also possessing certain properties thereby rendering the composition more useful for certain industrial purposes. Materials which can be added are one or more naphthenic acids, tall oils, fatty acids, or ammonium, amine or alkali metal salts of naphthenic acids, fatty acids, tall oil, rosin oil, fish oils, or one or more organic solvents possessing both hydrophilic and oleophilic properties, e. g.: aliphatic alcohols, alicyclic alcohols, esters, glycols, cresylic acids and the like. The materials may contain substituent polar groups such as OH, $SO_3$, $SO_4$, $NO_2$, and the like. If desired emulsifying bases comprising such additional ingredients may contain small or substantial amounts of oil.

The emulsifying base composition and the petroleum ether soluble oil-soluble petroleum sulfonate or other oil-soluble sulfonates soluble in other hydrocarbons boiling below 100° C. may be employed in the preparation of compositions of soluble oil, gel paste solution or droplet emulsion type for industrial uses such as in metal working, insecticidal, fungicidal, pharmaceutical, veterinary and domestic purposes. In preparing such compositions concentrates of the emulsifying base and dispersing sulfonate material are generally admixed with a mineral oil and/or fatty oil or mixtures thereof and dispersed in all proportions in water to give extremely stable emulsions at the place of use. This is done since a great economic saving is involved in not shipping a great quantity of water from place to place. In some instances the base may be used per se.

To more clearly illustrate the present invention, the following examples are presented. It is to be understood however that various modifications can be resorted to without departing from the spirit of the invention.

Example 1

To approximately 10 parts by weight of a base oil to be emulsified is added about 30 parts by weight of a petroleum ether soluble petroleum sulfonate and the mixture heated to about 50° C. To this mixture is slowly added an aqueous solution containing about 20 to 22 per cent of sodium $C_{10}$–$C_{18}$ secondary alkyl sulfate and about 5 to 7 per cent sodium sulfate and the entire mixture stirred under heat until a viscous translucent homogeneous gel is obtained. This mixture on cooling forms a stable viscous opaque paste which is completely miscible with oil. Generally approximately 20 parts by weight of this paste are blended under suitable conditions with 80 parts by weight of oil until a stable, homogeneous system is obtained.

This finished soluble oil disperses with water with or without agitation forming stable oil-in-water emulsions.

Example 2

A soluble cutting oil base which was soluble in all proportions with water and gave an extremely stable emulsion was prepared in the following manner.

Approximately equal parts by weight of petroleum ether soluble petroleum sulfonates were blended with sodium salts of secondary $C_{10}$–$C_{18}$ alkyl sulfates. About 67 parts of this blend was combined with about:

| | Parts |
|---|---|
| Cresylic acid or methyl cyclohexanol | 13.5 |
| Water | 15.0 |
| Spindle oil | 4.5 |

About 20 parts of this base composition was admixed with about 80 parts of spindle oil to form the final composition which formed extremely stable emulsions when diluted with water.

Example 3

A soluble cutting oil was prepared by blending at about 60° C. petroleum ether soluble sodium naphtha sulfonates, sodium salts of $C_{10}$–$C_{18}$ secondary alkyl sulfates and sulfated fish oil with a light spindle oil. The blend was cooled down to about 40° C. and minor amounts of diacetone alcohol, sodium hydroxide solution admixed and the resultant mixture reheated to about 60° C. to form a clear emulsion before cooling. The base was soluble in water and the base ingredients constituted the following proportions:

| | Parts by weight |
|---|---|
| 1. Petroleum ether soluble Na naphthasulfonate | 10.0 |
| 2. Na salt of $C_{10}$–$C_{18}$ secondary alkyl sulfate | 8.0 |
| 3. Sulfated fish oil | 4.0 |
| 4. Diacetone alcohol | 2.6 |
| 5. 6 N NaOH | 0.4 |
| 6. Spindle oil | 75.0 |

Example 4

Another soluble cutting oil was prepared in substantially the same manner as disclosed in Example 3 and comprised:

| | Parts by weight |
|---|---|
| 1. Petroleum ether soluble Na naphthasulfonates | 6.0 |
| 2. Na salts of water-soluble petroleum sulfonates | 12.0 |
| 3. Sulfated fish oil | 5.0 |
| 4. Ethyl alcohol | 2.0 |
| 5. Spindle oil | 75.0 |

Example 5

A soluble cutting oil was prepared by the method of Example 3 and has the following composition:

| | Parts by weight |
|---|---|
| 1. Petroleum ether soluble Na naphthasulfonate | 6 |
| 2. 30% aqueous solution of Na salt of primary $C_{10}$–$C_{18}$ alkyl sulfate | 6 |
| 3. Cresylic acid or methyl cyclohexanol | 2 |
| 4. Water | 5 |
| 5. Spindle oil | 81 |

Example 6

An emulsifier base was prepared as in Example 2 having the following composition:

| | Parts by weight |
|---|---|
| 1. Petroleum ether soluble Na naphthasulfonate | 30 |
| 2. 30% aqueous solution of Na salt of primary $C_{10}$–$C_{18}$ alkyl sulfate | 30 |
| 3. Na salt of secondary $C_{10}$–$C_{18}$ alkyl sulfate | 15 |
| 4. Cresylic acid or methyl cyclohexanol | 15 |
| 5. Spindle oil | 10 |

This base on diluting with oil gave a final composition which was dispersible in water and finally contained:

| | Parts by weight |
|---|---|
| 1. Petroleum ether soluble Na naphtha sulfonate | 6 |
| 2. 30% aqueous solution of Na salt of primary $C_{10}$–$C_{18}$ alkyl sulfate | 6 |
| 3. Na salt of sec. $C_{10}$–$C_{18}$ alkyl sulfate | 3 |
| 4. Cresylic acid or methyl cyclohexanol | 3 |
| 5. Spindle oil | 82 |

Example 7

An insecticidal composition was prepared by blending at between about 25° and 30° C., about 7.7 parts of petroleum ether soluble sodium naphthasulfonate, about 61.5 of Na salt of secondary $C_{10}$–$C_{18}$ alkyl sulfate and about 30.8 parts of a concentrated oil solution containing a mixture of pyrethrum and isobutyl undecylenamide. About 20 parts of this insecticidal base was diluted with 80 parts of water to form an aqueous emulsion of the droplet type.

Other examples of insecticidal compositions of this invention comprised:

| | Components | Amounts, parts by wt. | | | |
|---|---|---|---|---|---|
| 1 | Petroleum ether soluble Na Naphthasulfonates | 0.85 | 1.00 | 1.50 | 1.15 |
| 2 | Na secondary C$_{10}$-C$_{18}$ alkyl sulfate | 6.75 | 7.40 | 16.40 | 12.15 |
| 3 | Pyrethrum concentrate containing 8% pyrethrins | 2.25 | 2.70 | 2.40 | |
| 4 | β-butoxy-β'-thiocyano diethyl ether | | | | 3.35 |
| 5 | Kerosene | 1.20 | | 4.75 | |
| 6 | Water | 89.00 | 88.90 | 74.95 | 83.35 |

In the horticultural applications oil or water soluble insecticidal, fungicidal, bactericidal or other biocidal additions or substances active in horticultural plant stimulation may be added to the respective phases before formulation. Examples of such materials are: pyrethrum, aliphatic and/or aromatic thiocyanates, toxic chlorinated aliphatic aromatic compounds such as p,p'-dichlordiphenyl trichlorethanol, benzene hexachloride, derris, rotenone, dinitro cresol; insect repellent compounds such as dimethyl phthalate, mesityl oxide oxalate and the like. For fungicidal compositions used for fabric treatment, wood preservation and the like may be used the heavy metal salts of fatty acids, naphthenic acids and the like.

Additional emulsifier bases which can be used for various industrial and domestic purposes and which are completely dispersible in water or aqueous mediums are illustrated by the following examples:

| | Components | Amounts, parts by wt. | | | | | |
|---|---|---|---|---|---|---|---|
| 1 | Petroleum ether soluble Na petroleum sulfonate | 36 | 20 | 20 | 11.5 | 20 | 1.8 |
| 2 | Na secondary C$_{10}$-C$_{18}$ alkyl sulfate | 36 | 40 | 40 | 67 | 40 | 7.4 |
| 3 | Na or K naphthenate | | 12 | 20 | | | |
| 4 | Na or K soap of tall oil | | | | | 12 | |
| 5 | Naphthenic acid | 8 | | | | | |
| 6 | Tall oil | | | | 11.5 | 10 | |
| 7 | Ethylene glycol | 12 | | | | | |
| 8 | Cresylic acid or methyl cyclohexanol | | 11.2 | 11.2 | 8.5 | 11.2 | 2.2 |
| 9 | Ethyl alcohol | | | | | | 0.5 |
| 10 | p,p' dichlorodiphenyltrichlorethane | | | | | | 28.6 |
| 11 | Petroleum hydrocarbon | 16 | 8.8 | 8.8 | 1.5 | 6.8 | 59.5 |

In all cases the petroleum ether soluble petroleum sulfonate and water soluble sulfonates and/or sulfates mixtures may be used per se or as a concentrate containing 50 to 80 per cent by weight of mineral oil.

The petroleum hydrocarbon may be a spindle oil or a petroleum naphtha or the spindle oil in any of the above examples can be replaced by other hydrocarbons, such as light petroleum distillates, solvent naphthas, white spirits, gasoline, kerosene, gas oil, lubricating oil, tetrahydronaphthalene, or any liquid chlorinated hydrocarbon. The hydrocarbons may be replaced in part or in whole by synthetic oils and natural fatty oils. The synthetic oils may be produced by polymerization of olefins, copolymers of alkylene glycols and alkylene oxides, organic esters, e. g. 2-ethyl hexyl sebacate, dioctyl phthalate, tin octyl phosphate, polymeric tetra hydrofuran, and the like.

Compositions of this invention may be used in the metal processing art, cutting, grinding, degreasing and rustproofing. They may also be used in the textile and leather industries as well as in the preparation of cleaning compositions, such as paint cleaners, aqueous or solvent degreasing compounds, polishes and the like.

We claim as our invention:

1. A mineral oil concentrate capable of forming a stable oil-in-water emulsion, said concentrate comprising from about 50% to about 80% of mineral oil and from about 50% to about 20% of a mixture of (a) water-soluble sodium salt of a secondary alkyl sulfate containing from 10 to 18 carbon atoms, and (b) an ethylene glycol in admixture with (c) a petroleum-ether soluble fraction of oil-soluble sodium petroleum sulfonate which is free from petroleum-ether insoluble oil-soluble sodium petroleum sulfonate, the weight ratio of the sum of (a) and (b) to (c) being between 94:6 to 50:50, respectively.

2. A mineral oil concentrate capable of forming a stable oil-in-water emulsion, said concentrate comprising from 50 to 80% of mineral oil and from 50 to 20% of a mixture of (a) water-soluble sodium salt of a secondary alkyl sulfate containing from 10 to 18 carbon atoms and (b) methylcyclohexanol in admixture with (c) a petroleum-ether soluble fraction of oil-soluble sodium petroleum sulfonate which is free from petroleum-ether insoluble oil-soluble sodium petroleum sulfonate, the weight ratio of the sum of (a) and (b) to (c) being between 94:6 to 50:50, respectively.

3. A mineral oil concentrate capable of forming a stable oil-in-water emulsion, said concentrate comprising from 50 to 80% of mineral oil and from 50 to 20% of a mixture of (a) water-soluble sodium salt of a secondary alkyl sulfate containing from 10 to 18 carbon atoms and (b) cresylic acid in admixture with (c) a petroleum-ether soluble fraction of oil-soluble sodium petroleum sulfonate which is free from petroleum-ether insoluble oil-soluble sodium petroleum sulfonate, the weight ratio of the sum of (a) and (b) to (c) being between 94:6 to 50:50, respectively.

4. A mineral oil concentrate capable of forming a stable oil-in-water emulsion, said concentrate comprising from 50 to 80% of mineral oil and from 50 to 20% of a mixture of (a) water-soluble sodium salt of a secondary alkyl sulfate containing from 10 to 18 carbon atoms and (b) and alcohol having hydrophilic and oleophilic properties in admixture with (c) a petroleum-ether soluble fraction of oil-soluble sodium petroleum sulfonate which is free from petroleum-ether insoluble oil-soluble sodium petroleum sulfonate, the weight ratio of the sum of (a) and (b) to (c) being between 94:6 to 50:50, respectively.

5. A mineral oil concentrate capable of forming a stable oil-in-water emulsion, said concentrate comprising from 50 to 80% of mineral oil and from 50 to 20% of a mixture of (a) water-soluble alkali metal salt of a secondary alkyl sulfate containing from 10 to 18 carbon atoms and (b) and alcohol having hydrophilic and oleophilic properties in admixture with (c) a petroleum-ether soluble fraction of oil-soluble sodium petroleum sulfonate which is free from petroleum-ether insoluble oil-soluble sodium petroleum sulfonate, the weight ratio of the sum of (a) and (b) to (c) being between 94:6 to 50:50, respectively.

6. A mineral oil concentrate capable of forming a stable oil-in-water emulsion, said concentrate comprising from 50 to 80% of mineral oil and from 50 to 20% of a mixture of (a) water-soluble sodium salt of a primary alkyl sulfate containing from 10 to 18 carbon atoms and (b) an alcohol having hydrophilic and oleophilic properties in admixture with (c) a petroleum-ether soluble fraction of oil-soluble sodium petroleum sulfonate which is free from petroleum-ether insoluble oil-soluble sodium petroleum sulfonate, the weight ratio of the sum of (a) and (b) to (c) being between 94:6 to 50:50, respectively.

7. A petroleum base composition capable of forming stable oil-in-water emulsions comprising of the following ingredients in the following proportions:

| | Percent weight |
|---|---|
| Petroleum-ether soluble oil-soluble Na petroleum sulfonate | 6 |
| 30% aqueous solution of Na salt of primary $C_{10}$–$C_{18}$ alkyl sulfate | 6 |
| Na salt of secondary $C_{10}$–$C_{18}$ alkyl sulfate | 3 |
| Organic hydroxy compound selected from the group consisting of cresylic acid and methylcyclohexanol | 3 |
| Spindle oil | 82 |

8. A mineral oil concentrate capable of forming a stable oil-in-water emulsion, said concentrate comprising from 50 to 80% of mineral oil and from 50 to 20% of a mixture of (a) water-soluble alkali metal salt alkyl sulfate containing from 10 to 18 carbon atoms said alkyl radical being selected from the group consisting of primary and secondary alkyl radicals and (b) an alcohol having hydrophilic and oleophilic properties in admixture with (c) a petroleum-ether soluble fraction of oil-soluble sodium petroleum sulfonate which is free from petroleum-ether insoluble oil-soluble sodium petroleum sulfonate, the weight ratio of the sum of (a) and (b) to (c) being between 94:6 to 50:50, respectively.

9. A mineral oil concentrate capable of forming a stable oil-in-water emulsion, said concentrate comprising from 50 to 80% of mineral oil and from 50 to 20% of a mixture of (a) water-soluble alkali metal salt alkyl sulfate containing from 10 to 18 carbon atoms said alkyl radical being selected from the group consisting of primary and secondary alkyl radicals and (b) an alcohol having hydrophilic and oleophilic properties in admixture with (c) a petroleum-ether soluble fraction of oil-soluble alkali metal petroleum sulfonate which is free from petroleum-ether insoluble oil-soluble alkali metal petroleum sulfonate, the weight ratio of the sum of (a) and (b) to (c) being between 94:6 to 50:50, respectively.

REGINALD GORDON MITCHELL.
HAROLD CECIL TAIT.
CEDRIC LANSDALE GILBERT.
WERNER DAVID.

REFERENCES CITED

The following references are of record in the file of this patent:

UNITED STATES PATENTS

| Number | Name | Date |
|---|---|---|
| 2,049,043 | Birkby | July 28, 1936 |
| 2,052,164 | Buc | Aug. 25, 1936 |
| 2,088,019 | Wickert | July 27, 1937 |
| 2,307,744 | Liberthson | Jan. 12, 1943 |
| 2,314,450 | Holtzclaw | Mar. 23, 1943 |
| 2,391,087 | Donlan | Dec. 18, 1945 |

OTHER REFERENCES

"Surface Active Agents," by Young and Coons (1945), page 305.